United States Patent [19]

Nakamura

[11] Patent Number: 4,893,303

[45] Date of Patent: Jan. 9, 1990

[54] METHOD AND APPARATUS FOR PARALLEL COMPUTATION

[75] Inventor: Sadao Nakamura, Yamato, Japan

[73] Assignee: Kabushiki Kaisha Toshiba, Kawasaki, Japan

[21] Appl. No.: 266,152

[22] Filed: Nov. 2, 1988

[30] Foreign Application Priority Data

Nov. 11, 1987 [JP] Japan ................................ 62-284747

[51] Int. Cl.$^4$ ........................................... H04Q 11/04
[52] U.S. Cl. ....................................... 370/60; 370/94.1
[58] Field of Search ............................... 370/60, 94, 58

[56] References Cited

U.S. PATENT DOCUMENTS

| | | | |
|---|---|---|---|
| 4,621,359 | 11/1986 | McMillen | 370/60 |
| 4,630,260 | 12/1986 | Toy et al. | 370/60 |
| 4,638,495 | 1/1987 | Koike | 370/60 |
| 4,692,917 | 9/1987 | Fujioka | 370/60 |

FOREIGN PATENT DOCUMENTS

| | | |
|---|---|---|
| 71030 | 2/1983 | European Pat. Off. . |
| 232859 | 8/1987 | European Pat. Off. . |
| 2020456 | 11/1979 | United Kingdom . |
| 2117944 | 10/1983 | United Kingdom . |

OTHER PUBLICATIONS

W. J. Dally; A VLSI Architecture for Concurrent Data Structures, "The Torus Routing Chip"; pp. 170–183.
Judy M. Anderson et al.; "The Architecture of FAIM-1", Computer; Jan. 1987; pp. 55–65.

Primary Examiner—Herbert Goldstein
Assistant Examiner—Frank M. Scutch III
Attorney, Agent, or Firm—Foley & Lardner, Schwartz, Jeffery, Schwaab, Mack, Blumenthal & Evans

[57] ABSTRACT

A method of parallel computation capable of processing information with an improved processing efficiency is disclosed. The method utilizes the message transfer in terms of message packets in abbreviated format and the recording of the route of the message transfer. An apparatus for performing the method is also disclosed.

8 Claims, 5 Drawing Sheets

METHOD AND APPARATUS FOR PARALLEL COMPUTATION

BACKGROUND OF THE INVENTION

1. Field of the Invention

The present invention relates to a method and an apparatus for parallel computation and, more particularly, to a method and an apparatus for parallel computation capable of achieving an improved processing efficiency.

2. Description of the Prior Art

In a parallel computer utilizing a network formed by a multiplicity of interconnected processing units, the interconnection in general is furnished in a form of a two-dimensional torus network or N-cube network which connects the neighboring processing units. In such configurations, exchanges of messages between processing units not directly connected are carried out by passing through several processing units lying between such processing units.

FIG. 1 shows an example of such a configuration in which PE represents a processing element, R represents a router which controls transfers of messages in and out of the associated processing element, and a pair of PE and R forms a processing unit.

Messages are exchanged between the processing units in terms of message packets such as one shown in FIG. 2. A message packet consists of a header containing an address of the sending processing element(sender address), an address of the receiving processing element(receiver address), and a length of the message data(data length), and a main portion containing the message data itself(data). The routers control the routes of the message transfer by selecting the best path chosen to avoid the heavily engaged region.

Now, if a parallel computer contained approximately $10^3$ processing units, each of the address of the sending processing element and the address of the receiving processing element requires about 10 bits of memory space, so that at least 20 bits are necessary for the header of the message packet. In such a case, when message data itself is short, most of the message packet transferred consists of the header rather than the message data itself which conveys the actual information needed to be transferred so that the efficiency of message exchange becomes very low. In particular, when it is necessary to transfer a vast amount of short messages such as those of not much more than 1 bite length, the efficiency of message exchange becomes extremely low.

SUMMARY OF THE INVENTION

It is therefore an object of the present invention to provide a method for parallel computation capable of maintaining high efficiency of message exchange among processing units even when it is necessary to transfer a vast amount of short messages.

Another object of the present invention is to provide an apparatus capable of performing the method of the present invention.

According to one aspect of the present invention there is provided an apparatus for parallel computation which processes information represented in forms of message packets, a first of which contains an address of an ultimate destination of a message while the remaining of which do not contain the address, the apparatus comprising a multiplicity of processing units interconnected together, each of the processing units comprising processing element means for processing information and router means for controlling transfer of the message packets in and out of the processing element means, the router means including: means for deciding a way in which a first outgoing message packet is to be transferred from the router means to another router means in accordance with the ultimate destination of the message and the operational conditions of neighboring router means; routing table means for recording the way decided by the deciding means; and means for transferring all the message packets in accordance with the way recorded in the routing table means.

According to another aspect of the present invention there is provided a method for parallel computation comprising the steps of: (a) representing information in forms of message packets, a first of which contains an address of an ultimate destination of a message while the remaining of which do not contain the address; (b) deciding a way in which a first outgoing message packet is to be transferred from one processing unit to another processing unit in accordance with the ultimate destination of the message and the operational conditions of neighboring processing units; (c) recording the way decided by the deciding means; and (d) transferring all the message packets in accordance with the way recorded in the routing table means.

Other features and advantages of the present invention will become apparent from the following description taken in conjunction with the accompanying drawings

DETAILED DESCRIPTION OF THE PREFERRED EMBODIMENTS

Preferred embodiment of the present invention will now be explained with references to the figures.

Figure 1:
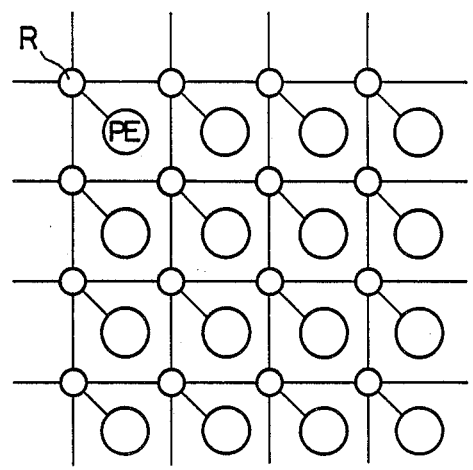
FIG. 1 is an illustration of an example of the configuration, of the processing units in a parallel computer.
Figure 2:
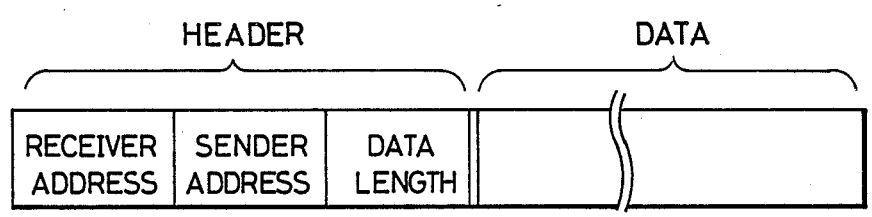
FIG. 2 is a diagrammatic illustration of the composition of a message packet utilized in the parallel computer of FIG. 1.
Figure 3:
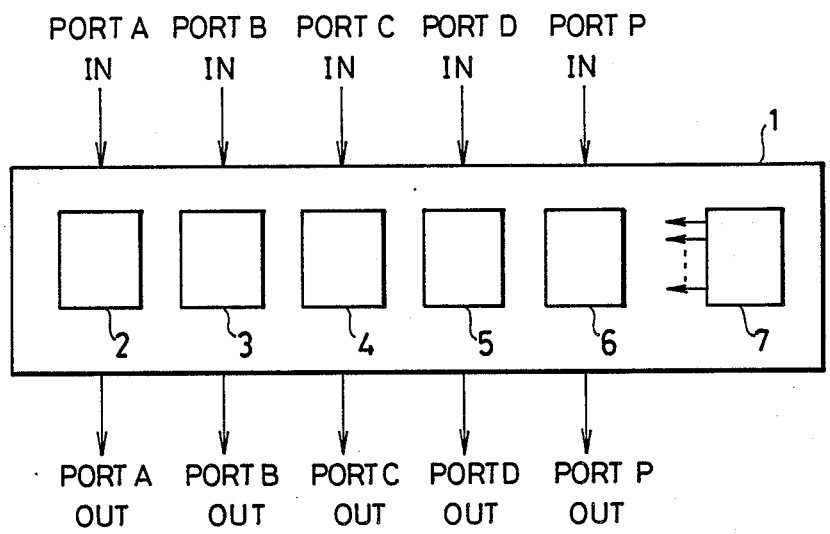
FIG. 3 is a diagrammatic illustration showing the configuration of a router in one embodiment of the parallel computer according to the present invention.

Referring now to FIG. 3, there is shown a detailed configuration of a router of the parallel computer according to the present invention. This router 1 has five exchange ports each of which consists of an input port and an output port. Four of these exchange ports, port A, port B, port C, and port D, are engaged in providing connections with the adjacent routers, while the other one, port P, is engaged in providing a connection with the processing element associated with the router 1. The router 1 further comprises five routing tables 2 to 6 corresponding to the each of the five exchange ports for recording data concerning the message transfer, and a control unit 7 which controls the message transfer in and out of the router 1 as well as the registration of data to the routing tables 2 to 6.

Figure 4:
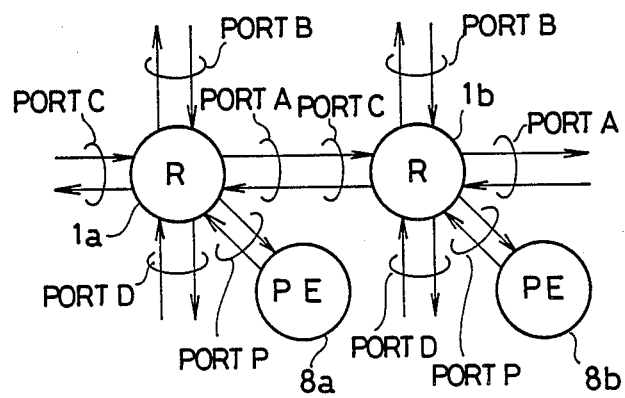
FIG. 4 is a diagrammatic illustration showing the connection between the processing elements and the routers in one embodiment of the parallel computer according to the present invention.

FIG. 4 shows the manner in which the router 1 is connected with adjacent routers as well as with the associated processing element 8. As shown in FIG. 4, in this embodiment the routers Rs are connected to form a two-dimensional grid together, while each router R is also connected with its associated processing element PE. The port A of each router points to the right, the port B of each router points upward, the port C of each router points to the left, and the port D of each router points downward.

The procedure of the message transfer in this embodiment will now be explained referring to FIGS. 5 to 7.

Figure 5:
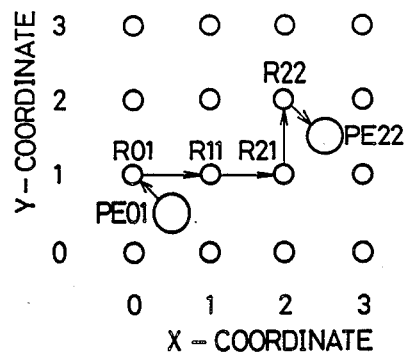
FIG. 5 is an illustration of the routers and the processing elements for explaining the procedure of the message transfer in one embodiment of the parallel computer according to the present invention.
Figure 6:
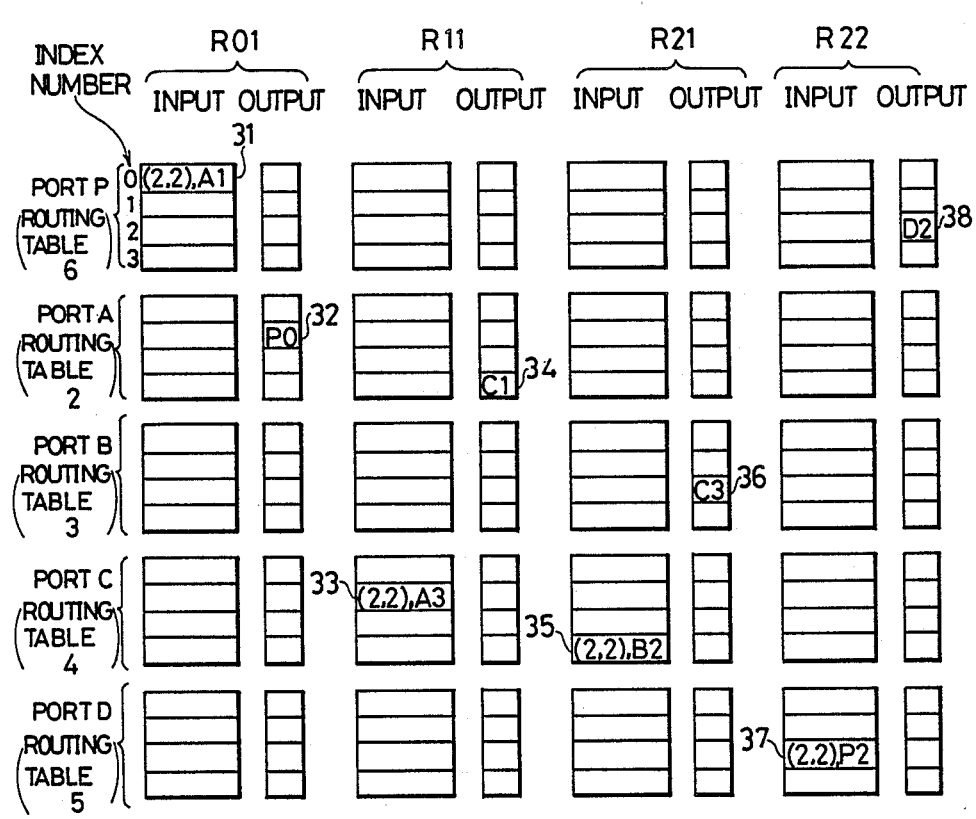
FIG. 6 is a diagrammatic illustration of the routing tables for explaining the procedure of the message transfer in one embodiment of the parallel computer according to the present invention.

As an example, consider the case in which a message is to be transferred from the processing element PE01 to the processing element PE22, as shown in Fig. 5 where routers are marked as R and processing elements are marked as PE as in the previous figures and the two numerals such as 01 following these labels denote x- and y- coordinates of the object, respectively. The route of the transfer of one message is determined by the control unit 7 of each router so as to avoid regions heavily engaged and malfunctioning routers.

Now suppose the route PE01 →R01 →R11 →R21 →R22 →PE22 has been selected, as shown in FIG. 5. Contents of the routing tables of the routers R01, R11, R21, and R22 in such a case is shown in FIG. 6. In this embodiment, each routing table is divided into an input table and an output table, each of which containing four entries. More on this FIG. 6 will be explained shortly. FIG. 7 shows message packets to be used in this embodiment. The first message packet of the message is given in full format consisting of a header containing an address of the receiving processing element and a number given to the message referred hereafter as the message number, and a main portion containing the message data itself, as shown in FIG. 7 (a). The remaining message packets of the message are given in abbreviated format consisting of the message number and the message data only, as shown in FIG. 7 (b).

Figure 7A:
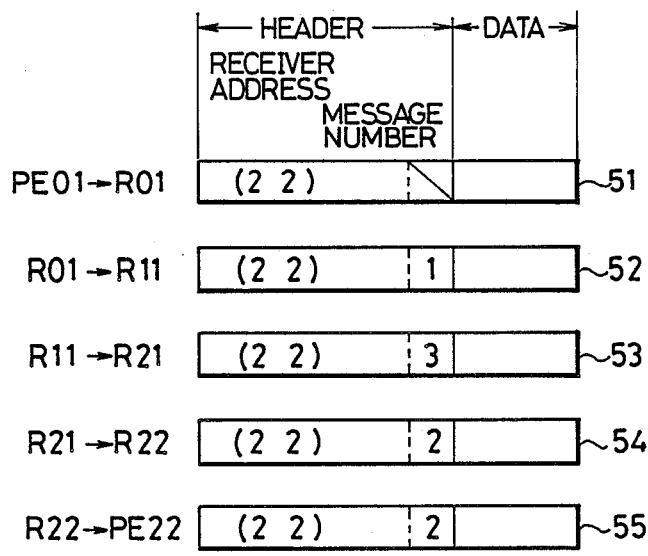
FIG. 7 (a) and FIG. 7 (b) are diagrammatic illustrations of the message packets for explaining the procedure of the message transfer in one embodiment of the parallel computer according to the present invention.
Figure 7B:
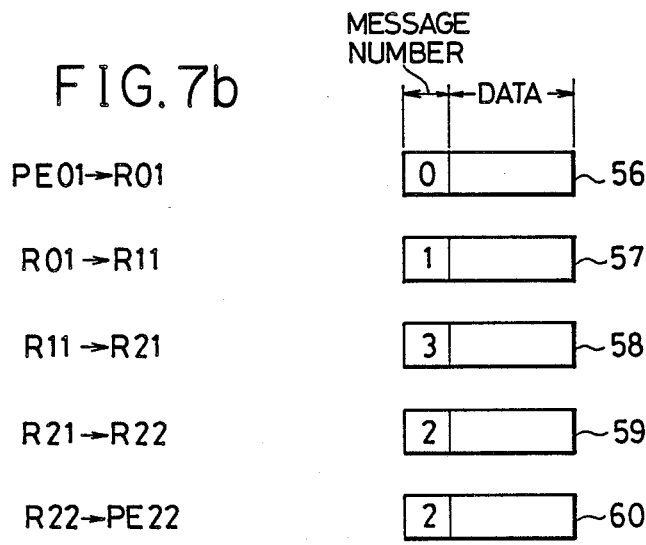

Now, when the message is transferred from the processing element PE01 to the router R01 initially, the packet 51 of FIG. 7 (a) is transferred. Then at the router R01, one of the entries in the routing table 6 which is the routing table corresponding to the port P through which the router R01 is connected with the processing element PE01 is selected and a number given to each entry, which will be referred hereafter as the index number, of the selected entry is given to the processing element PE01 as the message number of the message packets from the processing element PE01. This is carried out by the control unit 7 of the router R01 and, in this example, this number is 0. Subsequently, the address of the receiving processing element (receiver address), the label of the port from which the message is to be send out (output port), and the output message number which will be explained shortly are registered to the entry 31 which is the entry with the index number 0 in the input table of the routing table 6 at the router R01, in accordance with the fact that the index number 0 has been selected for the incoming messages from the processing element PE01. Since the message is to be transferred eventually to the processing element PE22 in this example, the receiver address registered at the entry 31 is (2,2). Also, since the message is to be transferred next to the router R11 in this example, the output port registered at the entry 31 is the port A through which the router R01 is connected with the router R11. The output message number in this embodiment is one of 0, 1, 2, or 3 and determined to be the one that is not currently used for the selected output port, or else if all of these four numbers are already in use for the selected output port an arbitrary one will be selected out of these four numbers. This output message number designates the index number of the entry to be used in the routing table of the output port. In this example, the output message number registered at the entry 31 is 1. Meanwhile, the signal P0 is registered to the entry 32 which is the entry with the index number 1 in the output table of the routing table 2 at the router R01 in order to indicate that it is currently occupied by the entry with the index number 0 in the routing table corresponding to the port P, in accordance with the fact that the entry with the index number 1 of the port A has been selected for the output of the message. Then the message packet 52 in FIG. 7 (a) which has the output message number 1 determined above as its message number is sent out from the port A of the router R01.

As the port A of the router R01 is connected with the port C of the router R11, this message packet 52 is received by the port C of the router R11. At the router R11, the receiver address, the output port, and the output message number are registered to the entry 33 which is the entry with the index number 1 in the input table of the routing table 4 which corresponds to the port C, in accordance with the message number of the message packet 52. The receiver address is the same as before, that is, (2,2). The output port is again the port A because in this example the message is to be transferred next to the router R21 and the router R11 is connected with the router R21 through the port A. The output message number is determined as before and in this example it is 3. Meanwhile, the signal C1 is registered to the entry 34 which is the entry with the index number 3 in the output table of the routing table 2 at the router R11 in order to indicate that it is currently occupied by the entry with the index number 1 in the routing table corresponding to the port C, in accordance with the fact that the entry with the index number 3 of the port A has been selected for the output of the message. Then the message packet 53 in Fig. 7 (a) which has the output message number 3 determined above as its message number is sent out from the port A of the router R11.

Similarly, as the port A of the router R11 is connected with the port C of the router R21, this message packet 53 is received by the port C of the router R21. At the router R21, the receiver address, the output port, and the output message number are registered to the entry 35 which is the entry with the index number 3 in the input table of the routing table 4 which corresponds to the port C, in accordance with the message number of the message packet 53. The receiver address is the same as before, that is, (2,2). The output port this time is the port B because in this example the message is to be transferred next to the router R22 and the router R21 is connected with the router R22 through the port B. The output message number is determined as before and in this example it is 2. Meanwhile, the signal C3 is registered to the entry 36 which is the entry with the index number 2 in the output table of the routing table 3 at the router R21 in order to indicate that it is currently occupied by the entry with the index number 3 in the routing table corresponding to the port C, in accordance with the fact that the entry with the index number 2 of the port B has been selected for the output of the message. Then the message packet 54 in FIG. 7 (a) which has the output message number 2 determined above as its message number is sent out from the port B of the router R21.

Likewise, as the port B of the router R21 is connected with the port D of the router R22, this message packet 54 is received by the port D of the router R22. At the router R22, the receiver address, the output port, and the output message number are registered to the entry 37 which is the entry with the index number 2 in the input table of the routing table 5 which corresponds to the port D, in accordance with the message number of the message packet 54. The receiver address is the same as before, that is, (2,2). The output port this time is the port P because in this example the message is to be transferred next to the processing element PE22 and the router R22 is connected with the processing element PE22 through the port P. The output message number is determined as before and in this example it is 2. Meanwhile, the signal D2 is registered to the entry 38 which is the entry with the index number 2 in the output table of the routing table 6 at the router R22 in order to indicate that it is currently occupied by the entry with the index number 2 in the routing table corresponding to the port P, in accordance with the fact that the entry with the index number 2 of the port P has been selected for the output of the message. Then the message packet 55 in FIG. 7 (a) which has the output message number 2 determined above as its message number is sent out from the port P of the router R22 to the processing element PE22.

Figure 8:
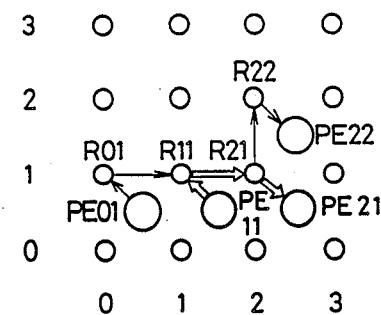
FIG. 8 is an illustration of the routers and the processing elements for explaining the procedure of the message transfer in one embodiment of the parallel computer according to the present invention.

As explained, in this example the route of the message transfer is recorded in the routing tables of the intervening routers dispersively. And the subsequent message transfer through this route can be carried out in terms of the message packets in abbreviated format such as those shown in FIG. 7 (b) by means of the message numbers carried by the message packets and the recorded data of this route in these intervening routers Namely, at the processing element PE01 the succeeding message packets are given the message number 0 as shown in the message packet 56 in FIG. 7 (b), which is the number that has been given by the router 01 at the initial stage of the transfer of the first message packet of the message The transfer through the route PE01→R01→R11 →R21 →R22 →PE22 can now be achieved by following the designations of the message numbers and the data in the routing tables of the intervening routers already recorded when the first message packet was transferred, so that the message packets given in abbreviated format such as the packets 56 to 60 in Fig. 7 (b) suffice. Thus, in this embodiment the message transfer from one processing unit to another processing element is accomplished in terms of the message packets given in abbreviated format except for the first message packet, and this implies a considerable contribution to the improvement of the efficiency of the message transfer Now, another example of the message transfer in this embodiment will be explained referring primarily to FIG. 9, in which the route from the processing element PE01 to the processing element PE22 is interrupted at a path between the router R11 and the router R21 by the inception of another message transfer from the processing element PE11 to the processing element PE21, as shown in FIG. 8.

Figure 9:
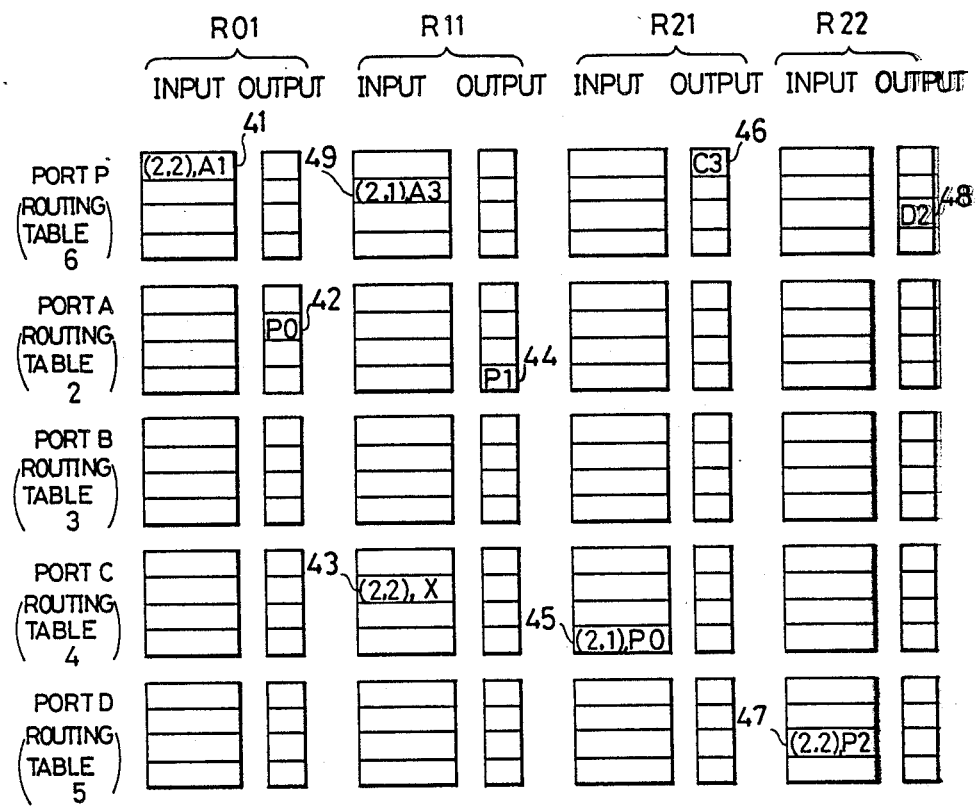
FIG. 9 is a diagrammatic illustration of the routing tables for explaining the procedure of the message transfer in one embodiment of the parallel computer according to the present invention.

At the beginning of the message transfer from the processing element PE11 to the processing element pE21, the receiver address, the output port, and the output message number are recorded in the routing table of the router R11 as in the previous example. In this example the message to be transferred from the processing element PE11 to the processing element PE21 is given the message number 1 at the router R11, so that the receiver address, the output port, and the output message number are recorded in the entry 49 in FIG. 9 which is the entry with the index number 1 in the input table of the routing table 6 which corresponds to the port P through which the router R11 is connected with the processing element PE11. The receiver address is (2,1) because this message is to be transferred eventually to the processing element PE21. The output port is the port A because this message is to be transferred next to the router R21 to which the router R11 is connected through the port A. The output message number in this example is 3. Meanwhile according to this embodiment as explained above, the signal P1 is to be registered to the entry 44 which is the entry with the index number 3 in the output table of the routing table 2 which corresponds to the port A. Here, although the signal C1 was present in the entry 44 from the message transfer between the processing element PE01 and the processing element PE22 as can be seen from FIG. 6, the newer signal is to be given a priority in this embodiment, as shown in FIG. 9. At the same time, the output port and the output message number of the entry 43 in the input table corresponding to the overridden signal C1 is rewritten as X, as shown in FIG. 9, in order to indicate that the route has been interrupted.

Then, the rest of the message transfer from the processing element PE11 to the processing element PE21 proceeds as in the previous example. Namely, as the port A of the router R11 is connected with the port C of the router R21, the message packet is received by the port C of the router R21. At the router R21, the receiver address, the output port, and the output message number are registered to the entry 45 which is the entry with the index number 3 in the input table of the routing table 4 which corresponds to the port C, in accordance with the message number of the message packet. The receiver address is the same as before, that is, (2,1). The output port this time is the port P because in this example the message is to be transferred next to the processing element PE21 and the router R21 is connected with the processing element PE21 through the port P. The output message number is determined as before and in this example it is 0. Meanwhile, the signal C3 is registered to the entry 46 which is the entry with the index number 0 in the output table of the routing table 6 at the router R21 in order to indicate that it is currently occupied by the entry with the index number 3 in the routing table corresponding to the port C. Then the message packet is sent out from the port P of the router R21 to the processing element PE21. The original information recorded in the entries 41, 42, 47, and 48 for the message transfer from the processing element PE01 to the processing element PE22 are left unchanged.

Now, when another message packet in abbreviated format carrying the message number 0, such as the packet 56 in FIG. 7 (b), is to be transferred from the processing element PE01 to the processing element PE22 after the interruption described above, the process explained earlier in the previous example proceeds until it comes to the entry 43 in which the signal X is encountered. Here, since the receiver address (2,2) of the message transfer by this route is also recorded in the entry 43, upon encountering the signal X this receiver address is attached to the packet in abbreviated format in order to regenerate the packet in full format, such as the packet 52 in FIG. 7 (a), and then the process explained earlier for the transfer of the first message packet which was in full format is carried out so as to reproduce the route before the interruption, so that the message transfer through the route PE01 →R01 →R11 →R21 43 R22 →PE22 can be resumed.

As described, in this embodiment the message transfer by the particular route can be carried out in terms of the packet in abbreviated format after the transfer of the first packet in full format which opens up the route, so that the efficiency of the message exchange is considerably improved, particularly for the exchanges of the short messages in the large computers.

Furthermore, in this embodiment the receiver address is also recorded in the routing tables of the intervening routers which is not affected by the interruption of the route by another route of another message transfer, so that the route can be reconstructed after such interruptions Therefore, the routing tables in this embodiment can be of rather limited capacity.

It is to be noted that although in the foregoing explanation the route of the message transfer appeared as predetermined, the route is actually to be determined as the transfer of the first message packet proceeds, that is, the control unit 7 of the each router makes the decision as to which direction the packet should be sent out in order to avoid the heavily engaged regions and the malfunctioning routers as the message packet comes in. This part of the operation has not been developed in the foregoing explanation because it can be furnished in various known methods and also in order to make the explanation as simple as possible so as to bring the distinctive features of the present invention forward and avoid possible confusions.

It is easily understood that although in the embodiment explained above the receiver address is also recorded on the routing tables in order to cope with the interruption by the other routes, this may be omitted in the cases such as when the capacities of the routing tables are sufficiently large so that the several routes can be set up simultaneously. In such cases the registration of the output port and the output message number to the routing tables suffice for the satisfactory performance, as can be discerned from the above explanation.

Besides these, many modifications and variations of this embodiment may be made without departing from the novel and advantageous features of the present invention. Accordingly, all such modifications and variations are intended to be included within the scope of the appended claims.

What is claimed is:

1. An apparatus for parallel computation which processes information represented in forms of message packets, a first of which contains an address of an ultimate destination of a message while the remaining of which do not contain said address, said apparatus comprising a multiplicity of processing units interconnected together, each of said processing units comprising:

processing element means for processing information; and router means for controlling transfer of said message packets in and out of said processing element means, said router means including:

means for deciding a route in which a first outgoing message packet of said message is to be transferred from said router means to another router means in accordance with the ultimate destination of said message and the operational conditions of neighboring router means;

routing table means for recording said route decided by said deciding means; and means for transferring all said message packets of said message in accordance with said route recorded in said routing table means.

2. The apparatus of claim 1, wherein said routing table means includes a plurality of entries with labels, and wherein each message packet except for said first message packet of said message further contains a label to specify one of said entries to which said message packet is to be registered, and wherein said routing table means also records the labels contained in the outgoing message packets, and wherein said rooter means further includes:

means for determining the labels to be contained in said outgoing message packets; and means for determining the label to be contained in the incoming message packet of said message from the processing element which originates said message.

3. The apparatus of claim 2, wherein said routing table means also records the address of the ultimate destination contained in said first message packet of said message, and wherein said router means further includes:

means for encoding a special indication in the place of said route and the label recorded in said routing table means for a message packet of an older message indicating that another message packet representing a newer message is to interrupt and to be sent out in the same route which has been used to send out said message packet of said older message before said another message packet representing said newer message is to interrupt and to be sent out in the same route which has been used to send out said message packet of said older message before; and means for attaching said address of said ultimate destination recorded in said routing table means to message packets of said older message when said special indication is encountered in the process of the transfer of message packets of said older message after said interruption by message packets of said newer message.

4. The apparatus of claim 2, wherein said routing table means comprises an input table and an output table, said input table being used to record said route decided by said deciding means and the labels contained in the outgoing message packets, said output table being used to record said route in which said incoming message packet has been transferred and the labels contained in the incoming message packets.

5. A method for parallel computation comprising the steps of:
   (a) representing information in forms of message packets, a first of which contains an address of an ultimate destination of a message while the remaining of which do not contain said address
   (b) deciding a route in which a first outgoing message packet of said message is to be transferred from one processing unit to another processing unit in accordance with said ultimate destination of said message and the operational conditions of neighboring processing units;
   (c) recording said route decided at step (b); and
   (d) transferring all said message packets of said message in accordance with said route recorded at step (c).

6. The method of claim 5, wherein in step (c) said route is recorded in a plurality of entries with labels,
   and wherein each message packet except for the first message packet of said message further contains the label to specify one of said entries to which said message packet is to be registered,
   and wherein step (c) also records the label contained in the outgoing message packets,
   and wherein the method further comprises the step of:
   (e) determining the labels to be contained in said outgoing message packets; and
   (f) determining the label to be contained in the incoming message packet of said message from a processing element which originates said message.

7. The method of claim 6, wherein step (c) also records said address of said ultimate destination contained in said first message packet of said message,
   and wherein the method further comprises the steps of:
   (g) encoding a special indication in the place of said route and the label recorded for a message packet of an older message indicating that another message packet representing a newer message is to interrupt and to be sent out in the same route which has been used to send out said message packet of said older message before said another message packet representing said newer message is to interrupt and to be sent out in the same route which has been used to send out said message packet of said older message before; and
   (h) attaching said address of said ultimate destination recorded to message packets of said older message when said special indication is encountered in the process of the transfer of message packets of said older messages after the interruption by message packets of said newer message.

8. The method of claim 6, wherein the step (c) comprises using an input table and an output table, said input table being used to record said route decided by the deciding step and said labels contained in said outgoing message packets, said output table being used to record the route in which said incoming message packet has been transferred and the labels contained in the incoming message packets.

* * * * *